Jan. 29, 1952      O. JACOBSEN      2,583,777
SHAFT SEAL

Filed Aug. 23, 1944      2 SHEETS—SHEET 1

INVENTOR
OYSTEIN JACOBSEN,
BY
Toulmin & Toulmin
ATTORNEYS

Jan. 29, 1952     O. JACOBSEN     2,583,777
SHAFT SEAL

Filed Aug. 23, 1944     2 SHEETS—SHEET 2

INVENTOR
OYSTEIN JACOBSEN
BY
Toulmin & Toulmin
ATTORNEYS

Patented Jan. 29, 1952

2,583,777

UNITED STATES PATENT OFFICE 2,583,777

SHAFT SEAL

Oystein Jacobsen, Montgomery County, Ohio, assignor to The Duriron Company, Inc., Dayton, Ohio, a corporation of New York Application August 23, 1944, Serial No. 550,748

2 Claims. (Cl. 286—11.14)

The present invention relates to shaft seals for centrifugal pumps which are designed to operate at considerable velocities and adapted to handle corrosive fluids.

In the case of pumps which handle acid-containing solutions and which employ an impeller mounted on an over-hanging shaft, it becomes necessary to prevent the creepage of the fluid from the position of the impeller along the surface of the shaft. Such creepage fluid might deleteriously affect the shaft and its ball-bearing journals.

It will be understood that in pumps of this character, those parts which come directly into contact with the liquid are made of a non-attackable metal such as silicon iron, but metal of this character is so hard as to be practically unmachinable. Those parts which require finishing to size and particularly the elements of the bearing are necessarily made of a machinable metal and hence are subject to attack by the acid. For that reason, creepage of acid toward such parts must be meticulously avoided.

A number of seals to prevent creepage of liquid have been proposed in the art but many of them were unsatisfactory for different reasons, mainly because they begin to wear after a short period of time, due perhaps to excessive friction, and unless immediately adjusted or repaired, allow small but important amounts of fluid to get past the seal. Still other types of seals are of complicated construction, hard to assemble, and difficult to adjust or replace.

The fact that pumps which handle acid-containing liquids usually involve fairly heavy impellers and are operated at considerable velocities also enhances the difficulties of affording complete obstruction to creepage liquid if undue pressure on the parts and corresponding excessive wear are to be avoided.

The primary object of the invention is to provide an improved form of seal structure and particularly one which employs only relatively simple parts and wherein adjustments to take up wear may be readily effected.

Another object is to provide a seal structure which is particularly adaptable to high-pressure pumps involving impellers which travel at considerable speeds and in which even the slightest portion of the liquid being impelled through the pump is prevented from creeping along the shaft.

Still another invention is to provide an improved seal structure of a self-lubricating character in order to reduce friction and wear and at the same time automatically to accommodate such wear so that a tight seal is always effected.

Another object is to provide an improved seal structure in which the tendency of the creepage fluid to flow in the radial and longitudinal directions is effectively prevented, the arrangement being such that each type of fluid creepage is effectively met by its own blocking or obstruction device and adequate provision is made for adjusting the effectiveness of either one of these devices.

These objects are attained in brief by employing a graphite seal member for providing the obstruction to the radial flow of liquid and replacing the usual type of packing ring by a gasket which surrounds edgewise the graphite member and is so arranged that a portion of the gasket is caused by the action of the fluid under pressure to press against the outer peripheral surface of the seal member. Consequently, longitudinal flow along the seal member is completely prevented.

The invention will be better understood when reference is made to the following description and the accompanying drawings, in which.

Figure 1:
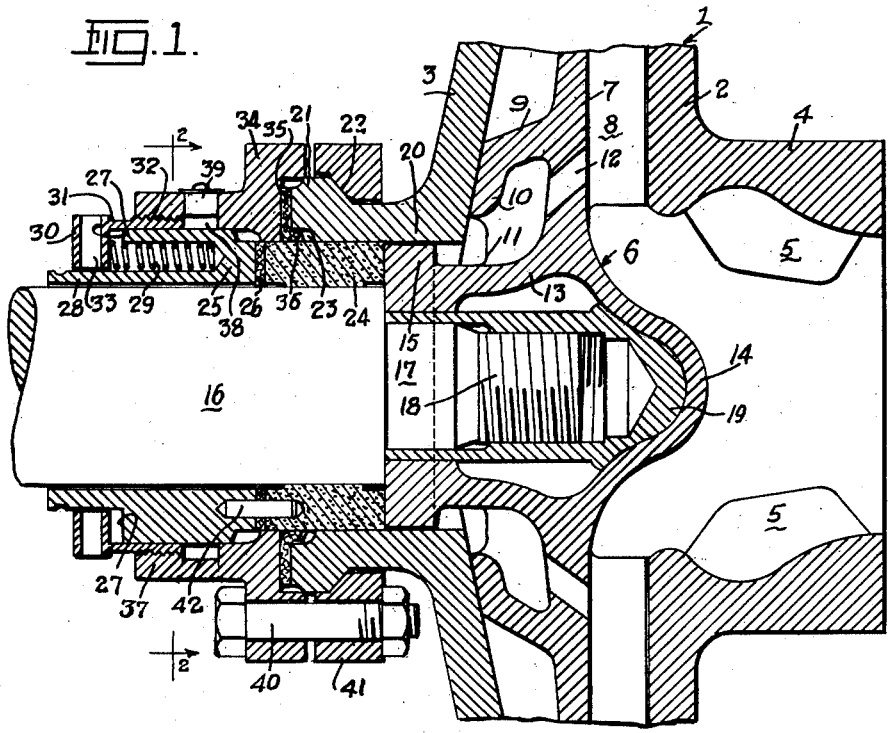
Figure 1 represents a fragmentary longitudinal sectional view of the improved seal as applied to a typical form of pump.

Referring more particularly to Figure 1, reference character 1 designates the casing of a centrifugal pump of the double-wall type, the walls being indicated at 2 and 3 respectively. The casing terminates at its periphery in a volute chamber (not shown) to which the outlet conduit is connected. A large cylindrical portion 4 which communicates with the interior of the casing serves as the inlet conduit as indicated by the arrow. A number of guide ribs or blades 5 may extend longitudinally of the inlet interior in order to prevent swirling of eddy current motion of the fluid as it enters the casing.

The impeller generally designated 6 is provided with a radially extending web 7 to which blades 8 are secured, these blades being given a curved shape as is well known in the art. The front wall 2 of the casing has a flat inner surface against which the blades have a running clearance while the other or rear wall 3 of the casing takes on a conical shape to accommodate an upstanding circular projection having an inwardly extending lip 10. There are a plurality of blades 11 secured between the web 7 and the annular extension 9, and a number of diagonally directed openings 12 pass through the web at positions opposite the blades 11.

The impeller at its rear side is provided with a hollow hub 13 and at its front side has a curved humped portion 14 which is also hollow. The hub 13 terminates at the left-hand end in an integrally joined thrust or sealing collar 15. The impeller is mounted on a shaft 16 having a pair of shouldered portions 17, 18 which project into the impeller and are centrally positioned by means of a liner 19 of machinable metal. The shaft portion 18 is provided with threads so as to engage threads formed in the liner.

It is apparent that as the shaft 16 is rotated, the impeller 7 and the front and rear blades set up suction and pressure effects within the casing 1 so as to cause fluid to be drawn into the inlet and forced out past the blades 8 to the outlet.

The function of the blades 11 is to return any liquid that has found its way to the rear of the impeller by setting up a pressure about the hub 13 and forcing this liquid through the openings 12 to the front side of the impeller. Notwithstanding the efficacy of these blades in taking care of the leakage fluid, there is still a tendency for fluid to pass along the outer surface of the collar 15 and to find its way to the shaft 16. In aggravated cases this fluid will creep along the entire length of the shaft and reach the bearings (not shown) in which the shaft is journaled. Even if the fluid constitutes ordinary water, damage to the bearings might ensue and this is particularly the case if the fluid being pumped is of an acid-containing character which attacks all machinable metal.

It will be understood that the pressure developed in the liquid by the impeller is often considerable so that there is a tremendous force acting hydrostatically through the fluid to cause the creepage liquid to travel along the shaft.

The present invention relates to an improved structure by which this creepage fluid is effectively prevented. As shown in Figure 1, the wall 3 of the casing extends rearwardly as a cylinder having an internal diameter slightly larger than that of the collar 15 in order to eliminate friction and this cylindrical extension terminates in an outwardly flared portion 21 having a chamfered inner edge 22. The portion 21 is provided with a counter bored annular recess 23 at its inner diametrical edge and the latter is spaced away from the shaft 16 so as to provide an annular compartment immediately surrounding the shaft. A sealing ring 24 of self-lubricating material such as graphite is contained within the compartment, this ring being of a size as snugly to fit within the space between the cylindrical extension 20 and the shaft. The ring 24 is sufficiently long to extend beyond the cylinder 20 and its extension 21.

Figure 2:
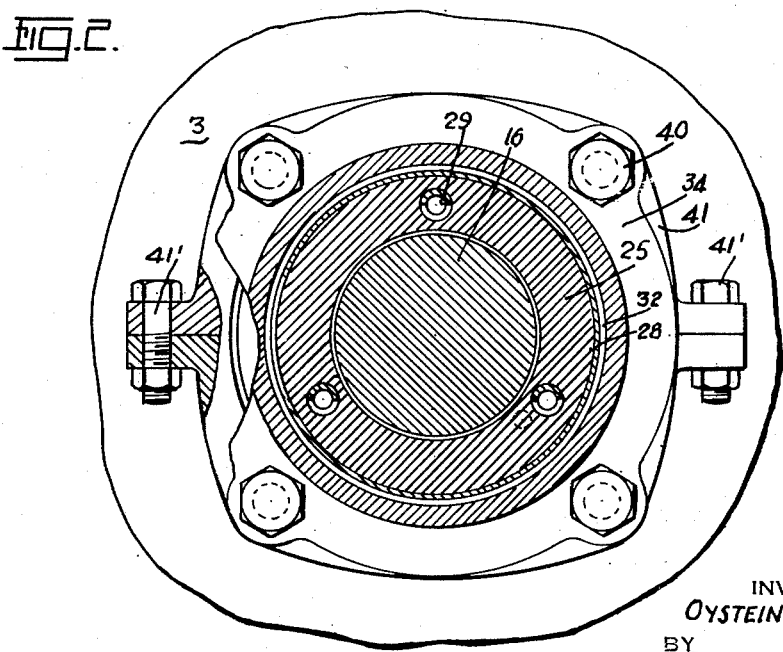
Figure 2 is a transverse sectional view of the structure shown in Figure 1 taken along line 2—2 and looking in the direction of the arrows.

There is a sleeve 25 loosely surrounding the shaft and is spaced from the ring 24 by a thin annular gasket 26 of a flexible acid-resisting material such as synthetic rubber. The gasket 26 is disposed on the outer end of the sealing ring and bears edgewise against the shaft 16. The sleeve has an outer diameter somewhat greater than the diameter of the ring 24 and is shouldered as indicated at 27 down to a relatively thin tubular portion 28. There are a plurality of longitudinally extending holes 29 equidistantly spaced about the sleeve 25 as seen in Figure 2 and each hole contains a compression spring 29. The latter bear against the inner surface of a ring 30 which loosely surrounds the tubular portion 28 and is provided with a longitudinally extending sleeve 31 which is threaded as indicated at 32. The springs 29 constitute a resilient coupling between sleeves 25 and 31.

The interior diameter of the sleeve 31 is such as to permit it snugly but slidably to fit over the sleeve 25. Two or more spanner openings 33 may be drilled in the ring for turning the same.

A clamp ring 34 on the inner end of the sleeve 37 surrounds the sealing ring 24 and is spaced from the casing portion 21 by a relatively heavy gasket 35 of synthetic rubber or similar material. This gasket has a sufficient width in the radial direction as to permit the inner edge to be bent longitudinally as indicated at 36 to enter the recess 23. It is apparent that the gasket is presented to and bears edgewise against the outside surface of the ring 24. The clamp ring has a longitudinally extending portion 37 provided with a multi-shouldered interior surface. The shoulder of larger diameter is threaded to engage the threads on the sleeve 31 and the shoulder of smaller size snugly but slidably fits over the sleeve 25. In order to assure free movement between the last-mentioned sleeve and the surrounding sleeve 31 a lubricating opening 38 may be provided in the extension 37 and closed by a grease gun fitting 39.

The clamp plate 34 may be secured to the casing flange 21 by means of four or more bolts 40 which pass through a clamp ring 41 fitting about the chamfered surface 22. This clamp ring is split as shown in Figure 2 and the two bolted together as indicated at 41¹. Thus, the sleeve 37 surrounds the sleeve 25 and serves, together with sleeve 31, to apply direct pressure to the gasket 35 and indirect pressure to the gasket 26 through the sleeve 25.

In operation, a pressure is first applied to the gasket 35 by tightening the bolts 40 and in pressing the material of the gasket the angular portion 36 thereof tends to press tightly against the graphite sealing ring 24. This tight joint precludes any leakage along the outer periphery of the sealing ring. It should also be noted that if any leakage fluid were to reach the recess 23 the pressure of this fluid would so act on the right-hand edge of the portion 36 of the gasket 35 as to press this portion more firmly against the sealing ring, thus still further increasing the obstruction to creepage fluid.

The next step in assembly or operation is to tighten the ring 30 by a spanner wrench which serves to increase the pressure on the springs 29 and in turn resiliently moves the sleeve 25 to the right to compress the gasket 26. It is obvious that compression of gasket 26 causes it to press firmly against the shaft 16 and form a fluid barrier. The pressure exerted by the latter is communicated through the sealing ring 24 to the joint between the ring and the collar 15 of the impeller. The tightness of this joint serves to prevent any leakage of fluid radially of the thrust collar and hence such fluid is precluded from reaching the shaft 16. In practice, there may be a tendency for the sealing ring 24 to rotate slightly with respect to the collar and the shaft and thereby to cause wear at some of the circular surfaces as well as at the end surface. It is therefore desirable to fix the sealing ring 24 in position and this may be conveniently done by providing the necessary openings and driving a pin 42 between the sleeve 25 and the sealing ring 24 through the gasket 26.

From the foregoing, it is evident that I have disclosed an improved form of seal structure which effectively prevents leakage both longitudinally and laterally of the shaft 16, even in the case of extremely high pressure fluid. Furthermore, adequate adjustment is provided at each of the joints by the bolts 40 and the spanner wrench ring 30. The springs 29 tend to equalize and to distribute evenly the force applied at the ring 30 throughout the entire surface of the sealing ring at the thrust bearing 15.

Figure 3:
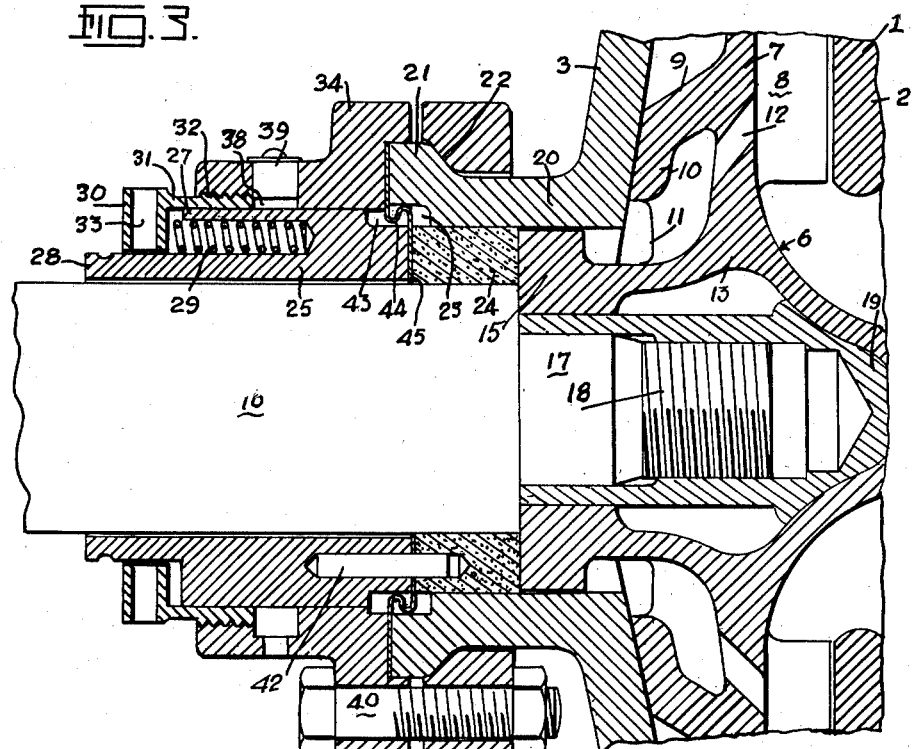
Figure 3 is a fragmentary longitudinal sectional view of a modified form of seal but in somewhat larger size than the structure shown in Figure 1.

Figure 3 shows a modified form of structure, particularly as it applies to the character of the sealing gaskets or washers. In this figure the outwardly flared portion 21 extends beyond the end of the sealing ring and the recess 23 aligns itself with the recess 43 formed in the sleeve 25. The recesses 23 and 43 form a continuous annular space for receiving a reverse loop 44 of a metal gasket 45. The inner portion of this gasket is positioned between the sleeve 25 and the sealing ring 24 and therefore takes the place of the rubber gasket 26 as shown in Figure 1. The outer portion of the metal gasket 44 is inserted between the counterbored surface in the clamp ring 34 and the flared portion 21 of the casing. Except in the particulars described immediately above, the structure shown in Figure 3 is similar to that shown in Figure 1. The extremely wide gasket 44 in Figure 3 offers some advantages over gaskets 35 and 26 in Figure 1 in that the entire gasket is of integral construction so as to offer an impenetrable wall to any fluid which tends to creep along the outer surface of the ring 24. In Figure 1, this creepage is precluded by the firmness with which the lower portion of the gasket 35 presses against the sealing ring 24 but in Figure 3 there are no joints at the corresponding position so that a solid wall effect is presented by the extra wide washer.

Figure 4:
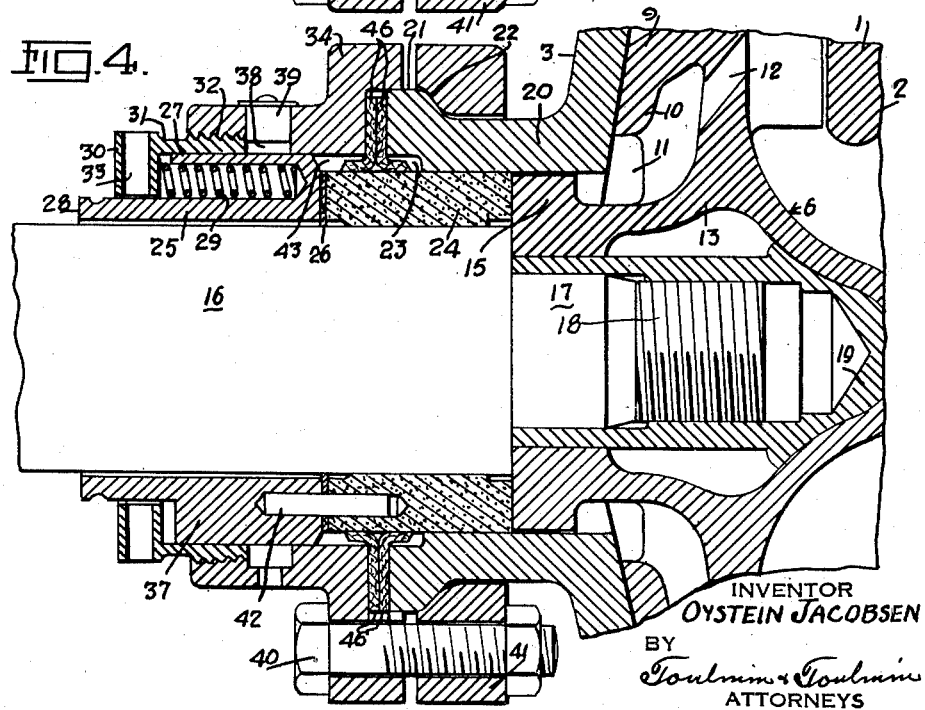
Figure 4 shows still another modification of the improved seal.

In Figure 4, a modification is shown in which a pair of narrow gaskets 46 of synthetic rubber or similar flexible material are provided between the flared portion 21 of the casing and the immediately adjacent counterbored portion of the clamp ring 34. These gaskets each have an angularly projecting portion which extend in opposite directions within the recesses 43 and 23. Any pressure fluid which tends to collect in the recess 23 will press the inner portion of the right-hand gasket more firmly against the sealing ring 24. On the other hand, the recess 43 tends to become evacuated which draws in air at atmospheric pressure and causes a firm contact to be established between the lower portion of the left-hand gasket 46 and the sealing ring. In this modification the gasket 26 is inserted between the adjacent surfaces of the sleeve 25 and the sealing ring 24 as in the case of Figure 1.

All of the adjustments which are described in connection with Figure 1 for applying pressure to the various gaskets or portions of the gaskets are clearly present in the modification shown in Figures 3 and 4 so that there is no tendency for any pressure fluid to leak through, radially or longitudinally, about the sealing elements and the shaft 16 and its bearings are completely protected.

It will be understood that I desire to comprehend within my invention such modifications as come within the scope of the claims and the invention.

Having thus described my invention, what I claim as new and desire to secure by Letters Patent, is:

1. In a seal for the shaft of a rotary machine, a sealing collar on said shaft, a hollow projection extending from the machine longitudinally of the shaft and spaced therefrom and forming an annular compartment adjacent to said shaft, a sealing ring surrounding said shaft and contained within said compartment, the inner end of the ring bearing against said sealing collar, a thin annular gasket disposed at the outer end of the sealing ring and bearing edgewise against said shaft, a sleeve loosely surrounding said shaft and having its inner end engaging said annular gasket on the outer end of said sealing ring, a second sleeve surrounding the first mentioned sleeve and in contact therewith and movable axially relative thereto, a spring inserted between said first and second sleeves, a third sleeve surrounding said second sleeve and detachably secured thereto, a gasket disposed at the outer end of said hollow projection and bearing edgewise against the outer surface of said ring, said third sleeve having its inner end engaging said last mentioned gasket on the outer end of said hollow projection, and means for moving said third mentioned sleeve toward said projection in order to apply pressure to the last mentioned gasket and to cause the second mentioned sleeve to apply pressure to the first mentioned gasket.

2. In a seal for the shaft of a rotary machine, a sealing collar on said shaft, a hollow projection extending from the machine longitudinally of the shaft and spaced therefrom and forming an annular compartment adjacent to said shaft, said projection having an annular recess at its inner diametrical edge, a sealing ring surrounding said shaft and contained within said compartment, the inner end of the ring bearing against said sealing collar, an annular gasket disposed on the outer end of the sealing ring and bearing edgewise against said shaft, a sleeve loosely surrounding said shaft and having its inner end engaging said annular gasket on the outer end of said sealing ring, a second sleeve surrounding the first mentioned sleeve and in contact therewith and movable axially relative thereto, a spring inserted between said first and second sleeves, a third sleeve surrounding said second sleeve and detachably secured thereto, a gasket disposed at the outer end of said hollow projection and having a portion which extends into said annular recess on said projection and bearing against said sealing ring, and means for pressing said third mentioned sleeve towards said projection in order to apply pressure to the last mentioned gasket to cause the second mentioned sleeve to apply pressure to the first mentioned gasket.

OYSTEIN JACOBSEN.

REFERENCES CITED

The following references are of record in the file of this patent:

UNITED STATES PATENTS

| Number | Name | Date |
| --- | --- | --- |
| 1,276,847 | Wilfley | Aug. 27, 1918 |
| 1,336,076 | Ellmauer | Apr. 6, 1920 |
| 1,849,912 | Daddysman | Mar. 15, 1932 |
| 1,881,723 | Lee | Oct. 11, 1932 |
| 1,900,523 | Schmierer | Mar. 7, 1933 |
| 1,902,960 | La Bour | Mar. 28, 1933 |
| 2,107,090 | Swennes | Feb. 1, 1938 |
| 2,163,127 | Limpert | June 20, 1939 |
| 2,192,395 | La Bour | Mar. 5, 1940 |
| 2,240,356 | Tessmer | Apr. 29, 1941 |
| 2,247,505 | Kohler | July 1, 1941 |
| 2,249,930 | Bailey et al. | July 22, 1941 |
| 2,408,315 | Jacobsen | Sept. 24, 1946 |
| 2,419,623 | Bettcher | Apr. 29, 1947 |

FOREIGN PATENTS

| Number | Country | Date |
| --- | --- | --- |
| 270,275 | Great Britain | of 1927 |